United States Patent [19]

Birch et al.

[11] Patent Number: 5,229,157

[45] Date of Patent: Jul. 20, 1993

[54] METHOD OF PREPARING A FOOD PRODUCT

[75] Inventors: Robert C. Birch, Wellingborough; John V. Stringer, Rushden, both of England

[73] Assignee: Thomas J. Lipton Co., Division of Conopco Inc., Englewood Cliffs, N.J.

[21] Appl. No.: 832,090

[22] Filed: Feb. 6, 1992

Related U.S. Application Data

[63] Continuation of Ser. No. 442,113, Nov. 28, 1989, abandoned.

[30] Foreign Application Priority Data

Nov. 28, 1988 [GB] United Kingdom ............... 8827696

[51] Int. Cl.$^5$ .................... A23L 1/0522; A23L 1/216
[52] U.S. Cl. ..................... 426/564; 426/565; 426/243; 426/613; 426/614; 426/578; 426/615; 426/589
[58] Field of Search ............. 426/564, 565, 566, 567, 426/568, 613, 614, 578, 579, 243, 615, 589

[56] References Cited

U.S. PATENT DOCUMENTS

| | | | |
|---|---|---|---|
| 3,043,700 | 5/1960 | Szczesniak | 426/92 |
| 3,333,965 | 10/1963 | Kurtzhalts | 426/94 |
| 3,346,387 | 10/1967 | Moncrieff et al. | 426/654 |
| 3,655,405 | 1/1970 | Karas et al. | 426/94 |
| 3,698,914 | 10/1972 | Kortschot et al. | 426/83 |
| 4,251,560 | 2/1981 | Dell et al. | 426/565 |
| 4,428,971 | 7/1982 | Havette et al. | 426/565 |

FOREIGN PATENT DOCUMENTS

| | | |
|---|---|---|
| 0071054 | 11/1985 | European Pat. Off. |
| 339784 | 11/1989 | European Pat. Off. |
| 029972 | 7/1984 | Japan |

OTHER PUBLICATIONS

"Favorite Recipes Coverted for Microwave Ovens"; B. K. Bourque, 1978.

*Primary Examiner*—Jeanette Hunter
*Attorney, Agent, or Firm*—Brumbaugh, Graves, Donohue & Raymond

[57] ABSTRACT

A method of preparing an aerated vegetable product comprising starch, oil and a heat-setting material. The method involves mixing the individual components and thereafter aerating with a gaseous material. The method is for example well suited to the preparation of an aerated potato product which has a different taste and texture compared to mashed potato. Other vegetable products can be made from for example sweetcorn, carrot or pea. Furthermore, products made according to the invention can retain their structure after being frozen and subsequently reheated.

11 Claims, No Drawings

METHOD OF PREPARING A FOOD PRODUCT

This application is a continuation of application Ser. No. 07/442,113, filed on Nov. 28, 1989, now abandon.

The invention relates to a method of preparing a food product. In particular, it relates to a method of preparing a potato product with a light aerated structure.

Many vegetables are consumed in a normal diet, including for example potato. It can be eaten in a variety of forms, such as French fries, that is sticks of fried potato, mashed potato, etc. One of the problems associated with mashed potato is the time it takes to prepare such a product. The preparation involves several steps, namely removing the skin from the potato, cooking the potato, such as by boiling in water, and mashing the potato and mixing with a liquid, such as milk or water in order to obtain a light creamy product. Furthermore, mashed potato once prepared may lose its characteristic properties after being frozen and subsequently thawed. Powdered mashed potato product which can be reconstituted with water to give an instant potato product is available. However, the texture and taste of the reconstituted powdered product does not compare favourably with freshly prepared natural product. The problems above are not uncommon with regard to the preparation for consumption of other types of vegetable, in particular preparations which involve a freezing step.

Light aerated food products are well known in the art as souffles. Such products are generally prepared by forming a mixture of fat, flour and milk or water to which the yolks and whites of eggs, beaten separately, are added. On heating, the mixture expands to give a product with a light, aerated structure.

One of the disadvantages associated with this method is that it involves several mixing stages. In particular, if the egg white is not beaten sufficiently before being added to the mixture of fat, flour and milk or water, then the product will not attain the required aerated structure during baking.

European Patent Specification 71 054 describes a method for the preparation of a frozen souffle product which involves the use of carbon dioxide to aerate the mixture. However, this method suffers from the disadvantage that the degree of mixing of individual components of the souffle is critical; mixing has to be carried out so that air incorporation is avoided.

It is an object of the present invention to prepare an aerated vegetable product, for example a potato product, which has a different taste and texture compared to for example mashed potato, and which can retain its structure after being frozen and subsequently reheated. The method is appropriate for the preparation of a wide variety of aerated food products which contain naturally, or have added a quantity of gelatinised starch.

Thus according to the invention there is provided a method for preparing an aerated food product, comprising a gelatinised starch, a liquid oil and a heat-setting material, the method comprising mixing the gelatinised starch, liquid oil and heat-setting material with an aqueous liquid, aerating with a gaseous material and thereafter treating the aerated food product to preset the aerated structure.

An advantage of the present invention over the methods described above for the preparation of traditional light aerated products, such as souffle products, is that it is more convenient and adaptable to large scale commercial use. Mixing can be carried out in a single step and the degree of mixing is not critical. Furthermore, egg yolk is not an essential component of the aerated food product of the invention.

The main advantage is that products made according to the invention can be pre-set and stored prior to consumption, if preferred in containers which may be open to the atmosphere, without significant loss of the aerated structure.

A further advantage of the invention is that it provides a method for the preparation of food products with a low calorific value.

The vegetable used in the invention may comprise any vegetable, for example potato, sweetcorn, carrot or pea.

The gelatinised starch component can be any edible vegetable starch, such as potato starch, rice starch, wheat starch, maize starch, sweetcorn starch, carrot starch, or pea starch, but is preferably potato starch. Irrespective of whether the natural starch content of a vegetable treated according to the invention is sufficient to work the invention, this natural starch content may be enhanced; as a result, mixtures of the foregoing starch components in a vegetable product according to the invention can therefore also be used. Mashed potato, prepared either from granules, flakes, or freshly cooked potatoes, is preferably used as the source of potato starch.

The heat-setting agent sets the aerated structure. Preferably the heat setting agent is a protein, such as milk protein, soy protein, gluten, fish protein, gelatin and egg albumen, or mixtures thereof. The protein can be fresh or rehydrated.

By liquid oil we include any edible liquid vegetable or animal oil which acts as a solubiliser for the gaseous material, or a low calorie fat replacer; examples of liquid oils include liquid butter or fish oil. At least part of the oil in the liquid oil component may be replaced by a liquid low-calorie fat-replacer. Particularly suitable fat replacers are the edible polyesters of polyhydric alcohols having at least four free hydroxyl groups, such as polyglycerols, sugars or sugar alcohols, and saturated or unsaturated, straight or branched alkyl chain $C_8$–$C_{24}$ fatty acids. The polyhydric alcohol fatty acid polyesters include any such polyesters or mixtures thereof of which, on an average, at least 70% of the polyhydric alcohol hydroxyl groups have been esterified with the fatty acids. Also fatty alkyl ether derivatives of glycerol, esters of $C_8$–$C_{24}$ fatty alcohols and polycarboxylic acids can be used for replacing at least part of the oil. Preferably the liquid oil is a liquid vegetable oil, such as groundnut or sunflower oil.

In a preferred embodiment the aqueous liquid consists of water. It can be added separately to the mixture containing the gelatinised starch, liquid oil and heat-setting material, or it may be added indirectly if a hydrated gelatinised starch is used.

The aerated food product can also contain any number of optional ingredients such as seasoning ingredients, for example salt, pepper, nutmeg, parsley or any other herbs.

The gelatinised starch is preferably present at a solids level of 5 to 20%, more preferably 10 to 20%, and the heat-setting agent is present at a level of 5–20% by weight. The liquid oil is preferably present at a level of 3–30%, more preferably 5–15%, most preferably 7–10% by weight. The balance is aqueous liquid and optional ingredients.

In the method according to the invention the gelatinised starch, liquid oil and heat-setting agent are initially mixed together with an aqueous liquid. Mixing can be carried out in most types of food mixer such as planetary, scroll or paddle mixers. The order of addition of individual components prior to mixing is not critical.

Preferably the components are mixed for 1–4 minutes at a temperature within the range from 5 to 30° C. The mixture is then transferred to an enclosed mixer and the gaseous material is added at a pressure of between $2.0 \times 10^5$ and $4 \times 10^5$ Pa at a temperature of not more than 30° C. Preferably the gaseous material is incorporated into the mixture at a temperature of 10° C. for 0.5–2.0 minutes.

The gaseous material can be any gas which is soluble in the liquid oil. It is preferably carbon dioxide, nitrous oxide or nitrogen. Upon release of the pressure, most of the dissolved gas comes out of solution forming a food product which is caused to expand like a foam. For a unit volume, the degree of aeration is called the overrun, which is defined as $$\frac{\text{weight of unaerated product} - \text{weight of aerated product}}{\text{weight of aerated product}} \times 100,$$

and is preferably from 5 to 100%, conveniently 10 to 100%.

Prior to storage, the aerated food product is treated to set the aerated structure. The structure can be set by a variety of methods including heating in a conventional oven, grilling, frying or fast freezing. Preferably the structure is set by either heating the product in a microwave oven, or steam setting. These last two methods have the advantage that fast and thorough setting of the entire product can be achieved without causing the formation of a dry crust.

Generally the aerated product is sub-divided into individual portions suitable for consumption prior to setting and storage. The product can be dosed into containers, which can withstand the conditions required for setting and storage. In another embodiment product is dosed into receptacles on a conveyer belt which continuously passes through, for example, a microwave oven. Individual portions preferably contain from 20 to 200 g of food product.

If a microwave oven with an output of 700 watts is used to set the food product, a typical treatment time for an individual portion is from 20 to 200 seconds. If a microwave oven with a different output is used the treatment time is adjusted accordingly.

After being set the products are stored. They can be stored at ambient temperatures, at frozen temperatures or under chill conditions depending on the storage time and the packaging material. In a preferred embodiment the product is dosed into a container, pre-set, demoulded and then packaged in a further wrap or container before or after being frozen to temperatures of between $-5$ to $-30°$ C.

After storage, and prior to consumption, the product is preferably reheated in a conventional or microwave oven. If the product is frozen during storage, it should preferably be reheated directly and without defrosting. Typically the heating time in a conventional oven for a portion of a product containing from 50 to 200 g of material, is from 5 to 50 minutes at a temperature from 150 to 220° C.

When the aerated food product is a potato product, it is suitable for eating alone or as an accompaniment for other foodstuffs.

In addition to products comprising solely aerated vegetable, such as for example aerated potato, aerated vegetable may be co-formed with one or more additional food components, such as meat, cheese, vegetable or sauce, or any combination thereof. Co-forming techniques may comprise, for example, coextrusion, providing one or more partially or fully enrobed fillings, or providing one or more toppings. Any one or more of the above co-forming techniques may be used in the same product, and may utilize one or more additional food components.

The invention is further illustrated by the following non-limiting Examples.

Example 1

A composition was prepared by mixing the following ingredients in a planetary mixer for 1.5 minutes at 60 RPM.

|  | % by weight |
| --- | --- |
| Mashed potato (80% water, 20% potato solids) | 80% |
| Egg-albumen | 9.5% |
| Groundnut oil | 9.5% |
| Salt, pepper and flavouring | 1% |

The mixture thus formed was transferred to a scraped surface heat exchanger and carbon dioxide gas was added at a pressure of $3 \times 10^5$ Pa (ie. the pressure at the interface between the gas and the mixture) at 10° C. The mixture was mixed for 1 minute. An aerated product was produced when the pressure was released on dosing the product into containers stable to microwave heating, with each containing approximately 80 grams of product, and subsequently set by heating in a microwave oven with an output of 700 watts for 80 seconds. After demoulding, the product was blast frozen and stored in a polyethylene bag at about $-18°$ C. Prior to consumption, the frozen aerated product was heated in a conventional oven at 180° C. for 25 minutes. The product had a light aerated structure.

A similar product was obtained when the groundnut oil was replaced by sunflower oil.

Products prepared according to this Example were perceived by consumers to have an interesting taste and texture compared to mashed potato.

Example 2

Food products are prepared according to the following composition:

|  | % by weight |
| --- | --- |
| Sweetcorn puree | 40–60% |
| Potato mash | 15–25% |
| Sunflower oil | 5–20% |
| 30% rehydrated egg white | 5–20% |
| Seasonings | 0–1% |

Using a Hobart mixer and paddle, the sweetcorn puree and seasonings are mixed together for 15 seconds. The rehydrated egg white is then added, and the mixture is further mixed for another 30 seconds. Then the sunflower oil is added, and the mixture mixed until the sunflower oil is absorbed, in practice around 30–60 seconds. Then the potato mash is added, and the mixture finally mixed for another minute. Although the mixing regime described above is preferred, its steps are by no means critical.

The mixture thus formed was transferred to a scraped surface heat exchanger and carbon dioxide gas was added at a pressure of $3\times10^5$ Pa (ie the pressure at the interface between the gas and the mixture) at 10° C. The mixture was mixed for 1 minute. An aerated product was produced when the pressure was released on dosing the product into containers stable to microwave heating, with each containing approximately 80 grams of product, and subsequently set by heating in a microwave oven with an output of 700 watts for 80 seconds. After demoulding, the product was blast frozen and stored in a polyethylene bag at about $-18°$ C. Prior to consumption, the frozen aerated product was heated in a conventional oven at 180 ° C. for 25 minutes. The product had a light aerated structure.

The product thus prepared was perceived by consumers to have an interesting taste and texture.

Example 3

Food products are prepared according to the following composition;

|  | % by weight |
|---|---|
| Pea puree | 50-70% |
| Pea flour | 6-12% |
| Potato mash | 10-20% |
| Bechamel sauce | 5-15% |
| Sunflower oil | 5-20% |
| 30% rehydrated egg white | 5-20% |
| Seasoning | 0-1% |

Using a Hobart mixer and paddle, the pea puree, bechamel sauce and seasonings are mixed for 15 seconds. To this is added the rehydrated egg white, and the mixture mixed for 30 seconds. Next the sunflower oil is added and the mixture mixed for a further 30-60 seconds, and finally the peaflour is added, whereupon the mixture is mixed for a further minute. Although the mixing regime described above is preferred, its steps are by no means critical The mixture thus formed was transferred to a scrapped surface heat exchanger and carbon dioxide gas was added at a pressure of $3\times10^5$ Pa (ie the pressure at the interface between the gas and the mixture) at 10 ° C. The mixture was mixed for 1 minute. An aerated product was produced when the pressure was released on dosing the product into containers stable to microwave heating, with each containing approximately 80 grams of product, and subsequently set by heating in a microwave oven with an output of 700 watts for 80 seconds. After demoulding, the product was blast frozen and stored in a polyethylene bag at about $-18°$ C. Prior to consumption, the frozen aerated product was heated in a conventional oven at 180 ° C. for 25 minutes. The product has a light aerated structure.

The product thus prepared was perceived by consumers to have an interesting taste and texture.

What is claimed is:

1. A method for preparing an aerated vegetable product, comprising first preparing a mixture of 3-30% liquid oil, 5-20% heat-setting material, an aqueous liquid, and a vegetable selected from the group consisting of potato, sweet corn, carrot and pea, wherein the vegetable comprises 5-20% natural or added gelatinized starch, all based upon the weight of the product, thereafter aerating the mixture with a gaseous material wherein the liquid oil acts as a solubilizer for the gaseous material, and thereafter heat treating the aerated product to preset the structure.

2. A method according to claim 1 wherein the gelatinised starch is potato starch.

3. A method according to claim 1 wherein the aerated product is pre-set in a microwave oven.

4. A method according to claim 1 wherein the gaseous material is selected from nitrous oxide, carbon dioxide or nitrogen.

5. A method according to claim 1 wherein the mixture is aerated to an overrun of more than 5%.

6. A method according to claim 5 wherein the mixture is aerated to an overrun of more than 10%.

7. An aerated vegetable product prepared according to claim 1, comprising 10-20% natural or added gelatinized starch, 5-15% liquid oil and 5-20% of a heat-setting agent by weight of the product, wherein the vegetable is selected from the group consisting of potato, sweet corn, carrot and pea.

8. An aerated vegetable product according to claim 7, wherein the starch content is 10-20%.

9. An aerated vegetable product according to claim 8 wherein the 10-20% starch content comprises potato starch.

10. An aerated vegetable product according to claim 7 or claim 8 co-formed with one or more additional food components, comprising for example meat, cheese, vegetable or sauce.

11. An aerated vegetable product according to claim 10 wherein co-forming comprises filling, topping, or coextrusion, or any combination thereof.

* * * * *

UNITED STATES PATENT AND TRADEMARK OFFICE
CERTIFICATE OF CORRECTION

PATENT NO. : 5,229,157

DATED : July 20, 1993

INVENTOR(S) : Birch et al.

It is certified that error appears in the above-identified patent and that said Letters Patent is hereby corrected as shown below:

Col. 1, line 5, "abandon" should read --abandoned--.

Col. 5, line 45, "scrapped" should read --scraped--.

Signed and Sealed this

Sixth Day of December, 1994

Attest:

BRUCE LEHMAN

Attesting Officer     Commissioner of Patents and Trademarks